E. G. PASSMORE.

Lawn-Mowers.

No. 8,560. Reissued Jan. 28, 1879.

WITNESSES.

J. Snowden Bell.

J. Walter Douglass

INVENTOR.

Everett G. Passmore, by Henry Baldwin Jr.

Atty.

UNITED STATES PATENT OFFICE.

EVERETT G. PASSMORE, OF PHILADELPHIA, PENNSYLVANIA.

IMPROVEMENT IN LAWN-MOWERS.

Specification forming part of Letters Patent No. 87,286, dated February 23, 1869; Reissue No. 6,305, dated February 23, 1875; Reissue No. 8,560, dated January 28, 1879; application filed December 3, 1878.

*To all whom it may concern:*

Be it known that I, EVERETT G. PASSMORE, of the city and county of Philadelphia, in the State of Pennsylvania, have invented certain new and useful Improvements in Lawn-Mowers, of which improvements the following is a full, clear, and exact description, reference being had to the accompanying drawings, which form part of this specification, and in which—

Figure 2:
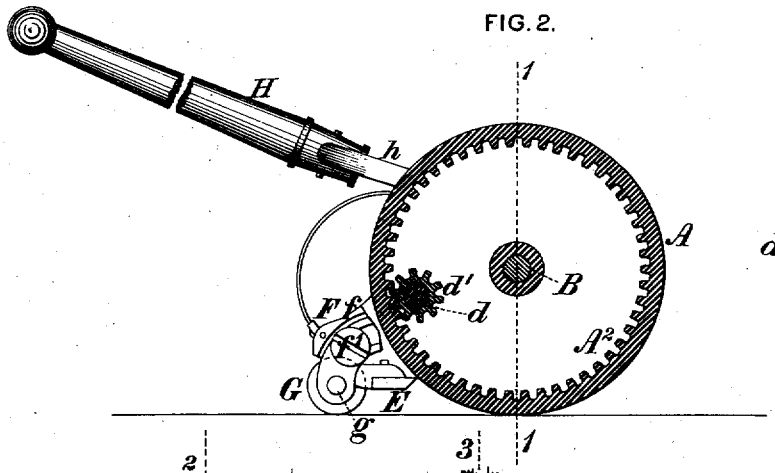
Figure 6:
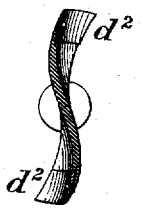
Figure 1:
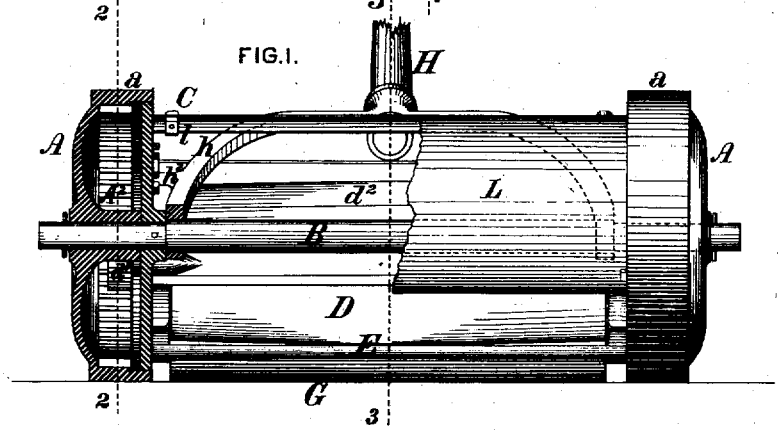
Figure 3:
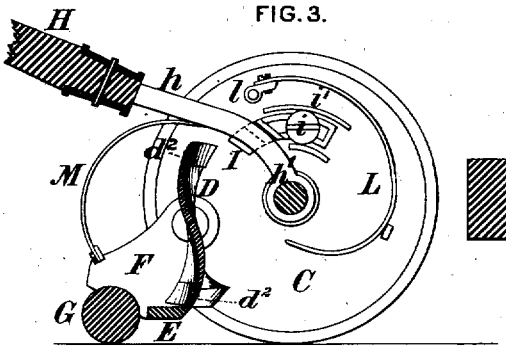
Figure 4:
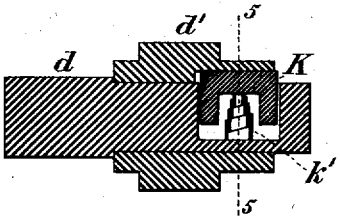
Figure 5:
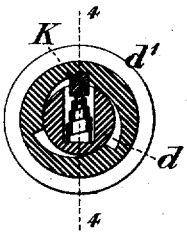

Figure 1 is a front view of my improved lawn-mowing machine, partly in section, on the line 1 1 of Fig. 2, and partly in elevation, as seen from the front. Fig. 2 is a vertical section through the machine on the line 2 2 of Fig. 1. Fig. 3 is a similar section on the line 3 3 of Fig. 1. Fig. 4 is a longitudinal section through the backing-ratchet on the line 4 4 of Fig. 5. Fig. 5 is a transverse section through the same on the line 5 5 of Fig. 4; and Fig. 6 is a transverse vertical section through the revolving cutter.

My improvements pertain to that class of machines for cutting grass which are designated as "lawn-mowers," by reason of the fact that they are used for shearing, cropping, and trimming grass plats, generally having irregular outlines, and are operated by hand. These machines differ from the ordinary mowing-machines or grass-harvesters in construction and mode of operation, not being intended to leave the cut grass as long as possible and in the best condition and position for curing and gathering to be stored as hay, but only to crop, shear, or trim to a level surface without regard to the cuttings. In the lawn-mower, therefore, it is not necessary that the cutting apparatus should project laterally, as in the grass-harvester, nor that the grass while being cut should be supported by guard-fingers, nor that the blades should have a draw cut across guard-fingers; and lawn-mowers have accordingly been constructed in various forms, with a main supporting-roller traveling in advance of or in rear of a fixed blade supported upon a secondary roller, against which fixed blade a rotating spiral cutter operated to sever the grass, the machine being pushed over the ground and guided by means of a bail. As instances of such lawn-mowers I may refer to the American patents of John Shaw, No. 83,101, dated October 13, 1868, and A. M. Hills, No. 73,807, dated January 21, 1868, and the English patents of Budding, No. 6,080, dated August 31, 1830, and Ferrabee, No. 1,277, dated June 7, 1858.

Machines of the class to which my improvements relate have been supported upon rollers, wheels, or shoes, arranged in various ways; but, in all cases, there was a main support and a secondary support, either in advance or in rear of the main support, the cutting apparatus being sometimes in front of the main and secondary supports, sometimes between the main and secondary supports, and, in one instance, in line with the axis of the main support. In this last instance there was a third support between the main and secondary supports. The objections to these modes of construction and to the modes of operation necessarily incident to such constructions are well understood, and it is the object of my invention to obviate these objections, at the same time reducing the number of parts and so simplifying the construction and arrangement of the parts retained as to secure an improved mode of operation and greater facility in the management of the machine.

My improved lawn-mower consists of two supporting traction-wheels, gearing arranged within the periphery of said wheels, a rotary spiral cutter in rear of the axis of said wheels and driven by the gearing within the periphery of the wheels, a supporting-roller in rear of the axis of the spiral cutter, and a fixed straight cutter between the supporting-roller and the axis of the supporting traction-wheels, between which straight cutter and the spiral cutter the shearing is effected, while the machine is pushed forward by means of a rearwardly-projecting handle or bail attached to the frame in advance of the fixed cutter, so that the machine is operated and its operation controlled as hereinafter more particularly described.

The following are among the special characteristics of my improvements: First, the supporting traction-wheels are made to act independently of each other, and are placed in front of as well as outside of the cutting apparatus in order to enable the machine to cut equally well on a curve, as when turning to the right or left, or in a straight line, as when being pushed directly forward; second, the frame which supports the cutting apparatus is made pivotal about the axis of the supporting traction-wheels, so as to enable the cutters to follow the inequalities of the ground independently of the traction-wheels, thereby embodying in a cutting apparatus supported at both ends the principle of the floating finger-beam of a grass-harvester, and this I effect in such manner as also to admit of the machine being turned over with the fixed cutter uppermost when the machine is being trundled over spaces where no cutting is to be done; third, the fixed cutter is placed in rear of the supporting traction-wheels, so that while it can rise and fall with the inequalities of the ground independent of the traction-wheels, yet those wheels, and the gearing within their peripheries, tend to lift the frame of the cutting apparatus, so as in a great measure to prevent the fixed cutter from dragging upon the ground, and, at the same time, as the machine is pushed forward with a pressure naturally tending downward, the traction-wheels not only receive the full thrust of the power applied to the bail, but they first meet and surmount any obstruction, shielding the cutting apparatus therefrom at the same time that they impart to the cutters the greatest percentage of the power transmitted through the gearing; fourth, the power is applied at the axis of the supporting traction-wheels, and the supporting roller is located behind that axis and in rear of the cutting apparatus, so that no support is required in rear of the roller, and the machine is not only made lighter and more compact and of fewer parts than heretofore, but the roller materially eases the drag that would occur on uneven ground, while at the same time it is of such small diameter as not to obstruct the cut grass thrown back from the cutters; fifth, the handle is pivoted to the frame in advance of the fixed cutter, so as to permit the cutting apparatus to rise and fall with the inequalities of the ground; sixth, stops are provided to limit the movement of the bail, so as to enable the operator to raise the cutting apparatus to pass obstructions, and also to prevent the gearing from unduly raising the cutters from the ground. The stops also serve to sustain the cutter-frame when the machine is turned upside down, as hereinbefore mentioned.

From the foregoing particulars it will be seen that the broad distinctions between my improved lawn-mover and those heretofore known result from my novel method of arranging the supporting traction-wheels and the entire driving mechanism in advance of the fixed cutter, the position of which determines the line of cut, and in applying the power in front of the cutting apparatus, and transmitting it backward through the gearing to the cutting apparatus in rear of the axis of the supporting traction-wheels; and this organization of the essential parts of the machine further enables me to make the frame on which the cutting apparatus is supported also inclose and protect the gearing which drives the cutting apparatus, such protection being particularly valuable in a lawn-mower, which, as already mentioned, cuts the grass in very short pieces, and, by reason of the action of the rotary cutters, tends to throw these short pieces toward the gearing, which, if unprotected, would soon be clogged.

In the accompanying drawings, which make part of this specification, I have shown all of my improvements embodied in one lawn-mowing machine. It is obvious, however, that some parts of my invention may be used without the others.

Two supporting traction-wheels, A $A^1$, acting independently of each other, turn loosely on the axle B, and each is cast with an inwardly-projecting flange, *a*, and with an internal driving-gear, $A^2$. A disk, C, keyed onto the axle B, fits snugly in the flange *a* of each wheel, and, while inclosing and protecting the gearing, allows the wheel still to turn on the axle.

Lugs F are secured to the disks C, behind the axis of the wheels A $A^1$, and project rearwardly and downwardly below and beyond the peripheries of the wheels, as seen in Fig. 3. The disks C and the lugs F, thus made pivotal about the axis of the supporting traction-wheels, constitute the frame which supports the cutting apparatus. On the outside of each of the lugs F is a curved guide, *f*, and on the under side of each lug is a recess or gain, in which is secured the fixed straight cutter E, extending across from one lug to the other, the front edge of this fixed cutter E defining the line of cut. In the curved guides *f* are fitted correspondingly-curved slotted arms *g*, which afford bearings for a roller, G, of small diameter, immediately behind the fixed cutter E, this roller sustaining the rear end of the pivotal frame at the height adjusted by means of screws *f'*. In the upper ends of the lugs F the rotary spiral blade D is mounted on trunnions *d*, projecting through the lugs, and within the flanges *a* of the wheels A $A^1$, to properly support the spur pinions D', which mesh into the internal driving-gears, $A^2$, behind the axis of the driving-wheels. These pinions, with the internal driving-gears, $A^2$, constitute the system of gearing in the machine, and this entire system is thus included within the peripheries of the supporting traction-wheels and covered by the disks C.

The cutting-blades $d^2$, Figs. 3 and 6, of the rotating cutter are thin steel strips, bolted to the spiral blade D in such manner that the strips may be set to project farther from the body D as their edges wear away. This construction enables the blades $d^2$ to be easily removed, sharpened, and replaced. The relation of the cutter-blades $d^2$ to the forward edge of the fixed cutter E is such as to produce the proper cutting action between these blades, the line of cut defined by the front edge of the fixed blades being, in all cases, behind the axis of the supporting traction-wheels, and the power being applied in front of the cutting apparatus and transmitted backward through the gearing.

The handle or bail H projects backward from the axle of the wheels A $A^1$, and its forked arms $h$ are provided with loops $h^1$, which fit the axle B, so that the tongue can be moved vertically about the axle. Lugs $h^2$ on the arms $h$ of the bail play in recesses of lugs I, which lugs are curved and slotted, and are adjustable in guides $i'$ on the disk C by set-screws $i$, as shown in Fig. 3, whereby the range of movement of the arms $h$ is determined, the arms having a slight range of motion in the lugs I. These lugs I serve as a resistance to any downward pressure applied upon the handle, either to depress the cutting apparatus or to lift the traction-wheels, and also afford resistance in the opposite direction when the handle is raised to lift the cutting apparatus; and when it is desired to trundle the machine across a space where no cutting is to be done, the bail can be reversed and the machine turned upside down, with the cutting apparatus supported above the axle upon the lugs I.

The supporting traction-wheels and the driving mechanism being thus arranged in advance of the cutting apparatus, and the power being applied at the axis of the supporting traction-wheels, the machine is pushed forward with a pressure naturally tending downward, while the small roller in rear of the cutting apparatus affords all the support required by it and by the pivotal frame without obstructing the proper fall of the cut grass.

In order that the gearing may stop when the machine is backed, I form a recess, $k$, in the shaft which drives the rotating cutter, (in this instance the trunnions $d^1$,) or of a shaft on which the pinion is mounted, the inside being formed into ratchets, as shown in Fig. 5. A yoke or pawl, K, plays radially to the shaft, and is pressed outward by a spring, $k'$. Consequently when the shaft turns forward the pawl catches against the ratchets and drives the cutters, but slips over them when backed, in the usual way. This is a useful device, as the pawl is out of sight, protected from injury, and yet is accessible at any time merely by slipping the pinion from the shaft.

To form a receptacle for the cuttings, I provide a cover, L, of sheet metal, with eyes at its upper edge to receive a rod, $l$, which enters holes in the disks C, and thus forms a hinge for the cover. The cover is curved, as shown in Fig. 3, so that its lower edge rests near the axle B. Another cover, M, is provided with points at its corners, so that they may be sprung into holes in the disks C and lugs F and securely hold the cover in place.

Having thus described the nature and object of my improvements in lawn-mowers, what I claim as new, and desire to secure by Letters Patent, is—

1. A lawn-mower in which are combined two supporting traction-wheels, a supporting-roller in rear of said wheels, a fixed blade in front of said supporting-roller and in rear of the supporting traction-wheels, a rotary spiral cutter, driving-gearing from which the power is transmitted backward to the spiral cutter, and a rearwardly-projecting handle through which the propelling power is applied, these parts being combined and operating in combination, substantially as set forth.

2. A lawn-mower in which are combined two supporting traction-wheels, driving-gearing within the periphery of said wheels, a cutting apparatus operating in rear of the axis of said wheels, and a frame for the cutting apparatus having its front end pivotal about the axis of the supporting traction-wheels, substantially as and for the purposes set forth.

3. A lawn-mower in which are combined two supporting traction-wheels, a cutting apparatus operating in rear of the axis of said wheels, a frame for the cutting apparatus, which frame is pivotal about the axis of the said wheels, a rearwardly-projecting bail, and stops controlling the movements of the bail, substantially as described.

4. The combination, with two supporting traction-wheels and gearing within the periphery of said wheels, of a pivotal frame inclosing and protecting the gearing and supporting the cutting apparatus, substantially as described.

5. The combination, substantially as set forth, of loose supporting traction-wheels, internal gears, fixed disks, a rotary cutter, and pinions mounted directly on the rotary cutter-shaft.

EVERETT G. PASSMORE.

Witnesses:
J. SNOWDEN BELL,
J. WALTER DOUGLASS.